United States Patent
Fakhrizadeh

(10) Patent No.: US 10,888,476 B2
(45) Date of Patent: Jan. 12, 2021

(54) STANDING CHAIR

(71) Applicant: Mohammad Fakhrizadeh, Saveh (IR)

(72) Inventor: Mohammad Fakhrizadeh, Saveh (IR)

( * ) Notice: Subject to any disclaimer, the term of this patent is extended or adjusted under 35 U.S.C. 154(b) by 143 days.

(21) Appl. No.: 16/396,742

(22) Filed: Apr. 28, 2019

(65) Prior Publication Data

US 2019/0388289 A1  Dec. 26, 2019

(51) Int. Cl.
| | |
|---|---|
| *A61G 5/14* | (2006.01) |
| *A61G 5/12* | (2006.01) |
| *A61G 5/10* | (2006.01) |
| *A47C 1/032* | (2006.01) |

(52) U.S. Cl.
CPC .............. *A61G 5/14* (2013.01); *A47C 1/032* (2013.01); *A61G 5/1056* (2013.01); *A61G 5/124* (2016.11); *A61G 5/125* (2016.11); *A61G 5/128* (2016.11)

(58) Field of Classification Search
CPC ........ A61G 5/14; A61G 5/124; A61G 5/1056; A61G 5/128; A61G 5/125; A47C 1/032
USPC ............. 297/DIG. 10, DIG. 4, 411.37, 330
See application file for complete search history.

(56) References Cited

U.S. PATENT DOCUMENTS

| | | | | |
|---|---|---|---|---|
| 2,769,483 | A * | 11/1956 | Peterson | A61G 5/00 297/375 |
| 2,786,512 | A | 3/1957 | Moyer | |
| 4,456,086 | A * | 6/1984 | Wier | A61G 5/14 180/11 |
| 4,846,527 | A * | 7/1989 | Julien | A61G 5/10 297/411.36 |
| 5,803,545 | A | 9/1998 | Guguin | |
| 5,984,338 | A * | 11/1999 | Meyer | A61G 5/14 280/304.1 |
| 5,984,418 | A * | 11/1999 | McInturff | A61G 5/1062 248/298.1 |
| 6,557,940 | B2 | 5/2003 | Hayashi et al. | |
| 6,773,073 | B1 * | 8/2004 | Escobedo | A61G 5/12 280/304.1 |
| 7,000,988 | B2 | 2/2006 | Bressler et al. | |
| 7,025,415 | B1 | 4/2006 | Wu | |
| 7,540,565 | B2 | 6/2009 | Lipford | |
| 7,600,815 | B2 * | 10/2009 | Corcoran | A61G 5/14 297/339 |

(Continued)

FOREIGN PATENT DOCUMENTS

JP     2004041493 A  *  2/2004

*Primary Examiner* — Milton Nelson, Jr.

(57) ABSTRACT

A standing chair comprises a main frame support assembly with a first frame support and a second frame support, at least two collapsible support arms with a first end and a second end, at least one bracket, at least one seat assembled to the collapsible support arms, a drive member positioned between right frame support and one collapsible support arm, another drive member positioned between left frame support and other collapsible support arm and a foot rest assembly with a pair of leg support bars. Right and left frame supports are parallelly connected and locked via a connecting means. The first ends of collapsible arms are moveably affixed to both right and left frame supports, whereas second ends are pivotally connected to a backrest support via fasteners. The two collapsible support arms are configured to automatically collapse and retract in accordance to sitting or standing mode of the standing chair.

13 Claims, 13 Drawing Sheets

(56) References Cited

U.S. PATENT DOCUMENTS 7,815,209 B2 10/2010 Porcheron
8,414,074 B2 4/2013 Kramer et al.

* cited by examiner

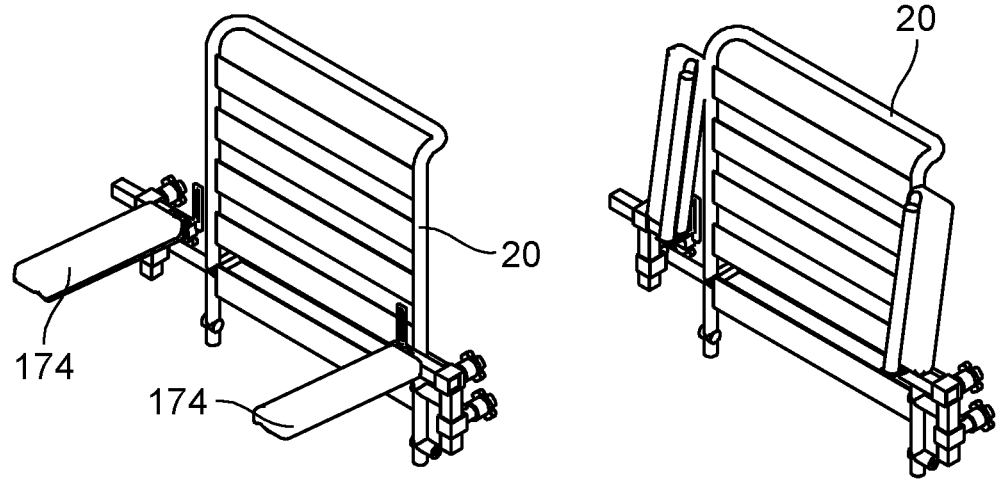
FIG. 16A  FIG. 16B
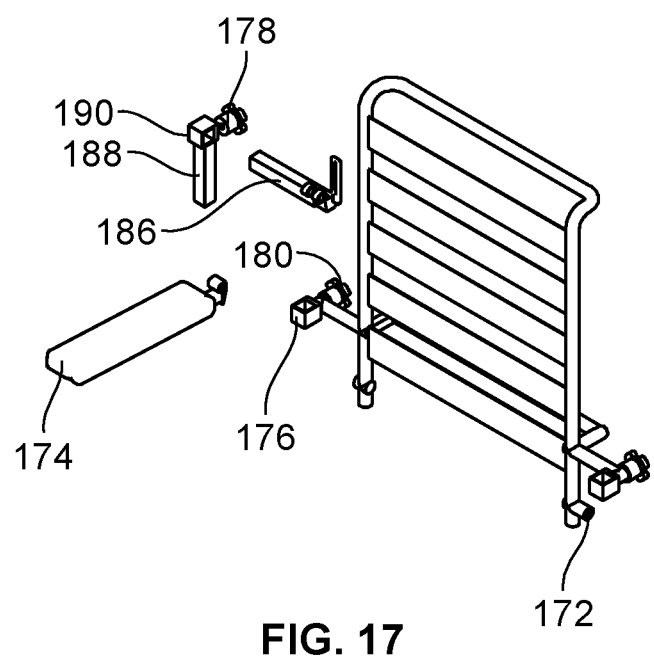
FIG. 17

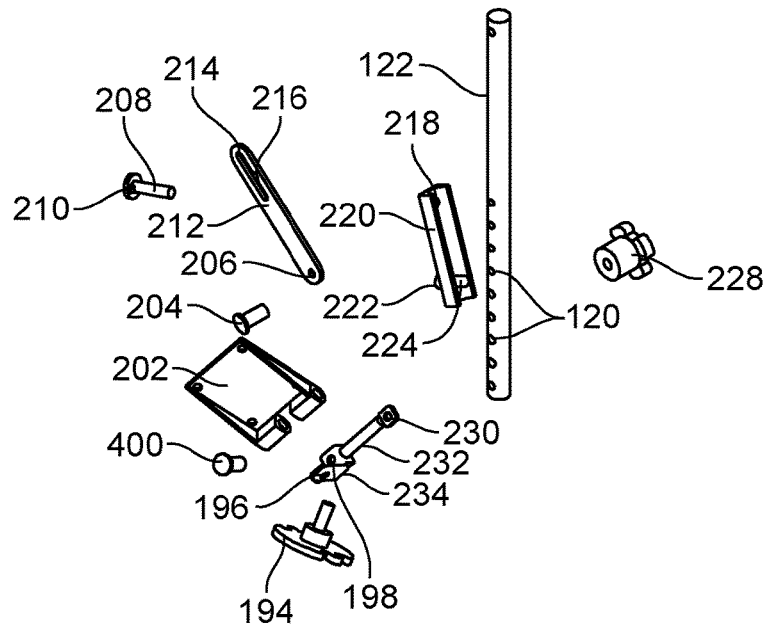
FIG. 18
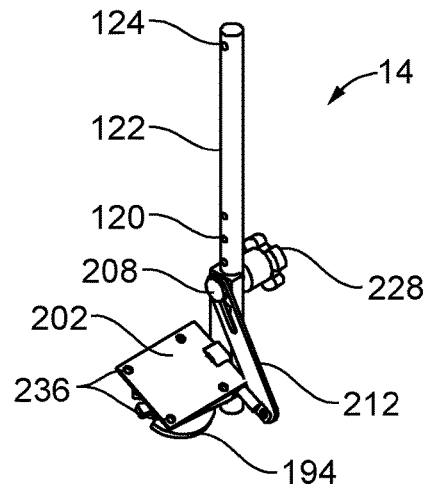
FIG. 19
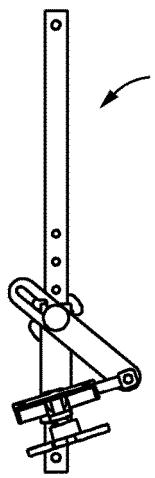     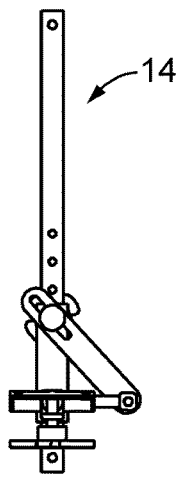     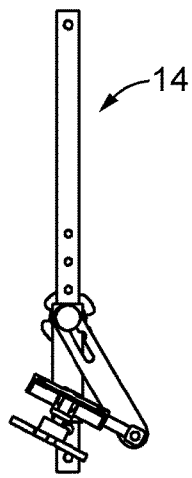     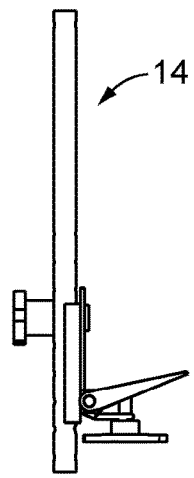     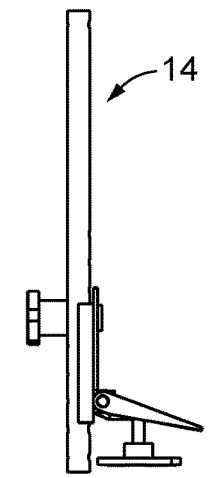
FIG. 20A   FIG. 20B   FIG. 20C   FIG. 20D   FIG. 20E

STANDING CHAIR

BACKGROUND OF THE INVENTION

Disabled people can find it hard to move from a sitting position to a standing position, which can be a both stressful for the person and a major inconvenience. From a physiological perspective, it is also detrimental because if a person loses the ability to stand, they will encounter various problems such as low bone density, urinary tract problems, cardiovascular, etc.

Currently, there are several devices available in the market, such as tilt tables and standing wheelchairs which have attempted to address the problem. The tilt tables incorporate a flat surface which pivotally attaches to a base via many different mechanisms to move the person/patient to the standing position. However, the tilt tables do not have any effect on other body parts such as tendons, muscles, joints, etc. Also it is typically difficult to transfer a patient to the tilt table and especially so by the caregiver. In addition, the patient must be able to lay straight and in face-up position.

A prior art, U.S. Pat. No. 7,815,209, describes a standing wheelchair for handicapped people that includes a seat support structure, a footrest support structure, & a backrest support structure. The invention allows a bending adjustment of the knees to suit the user by setting the angle between the footrest and the seat in the standing position, and by adjusting the amplitude of the relative rotation between the seat support structure and the footrest support structure when standing. The footrest support system can be adjusted which includes an adjustable end-stop against which the footrest support structure bears in the standing position.

Another prior art, U.S. Pat. No. 2,786,512, describes a combination therapeutic chair and a tiltable top adapted to use as a tilt-board. Other prior art disclose a standing chair that requires relatively complex and expensive components. However, the existing standing chairs do not enable the user/patients to easily operate the standing chair during the sitting and standing process. An extreme force could be exerted on the user's back during the sitting and standing process if they cannot adjust their position cause severe damages. Therefore, the patient should be able to reposition themselves to avoid this and stress on their skin. The existing standing chairs are not flexible to the users/patients. Further, straps of the existing standing chairs are not able to adjust while standing process. Also, patients who experience contractures in their feet must have continuous supervision to use the existing standing chairs. The existing standing chairs are not configured to provide repetitive sitting positions and standing positions and are limited in use.

The existing standing chairs and wheelchairs have their own drawbacks including the fact that only people with upper body strength with active sensory nerves can effectively use them. The reason being that the posterior height of a patient from the back of the head to the heel is equal to that of the medial of the body in a standing position, but it is longer in a sitting position; thus, during the sitting and standing process, an extreme shear would be exerted on an area of skin and if they don't feel pain and cannot adjust their position will encounter possible injuries. Therefore, the patient should be able to feel the pain and reposition themselves to avoid this shear and stress on their skin. The knee support on these devices has a fixed position and is not adaptable for different sizes of people. Due to many situations, it is desirable for the knee support to sometimes cover the knee caps and other times it is better to support the superior end of the shins and these chairs do not provide this option.

A belt that supports the hip area in most patients must be fastened and secured to the side of a chair. If it is adjusted in a sitting position, it will become lost during the standing process; and if it is adjusted when the person is in the standing position, it will become extremely tight when they move to the sitting position and must have continuous supervision to use these devices. Therefore, patient use is limited. For example, only a paraplegic might be able to use them but not a quadriplegic. In some instances, many paraplegics upon touch or being moved might have strong spasms in the lower limbs. If this occurs, the driving force of the lifting mechanism may overcome the extensive force of the spasm and a person with no sensation cannot alert the caregiver resulting in severe damage.

Also, some patients experience contractures in their feet and these chairs do not take into consideration any deformity in their feet. And without proper distribution of weight, any extreme force on their ankles can cause damage. Although standing is important, the repetitive sitting/standing motion has positive effects on the cardiovascular system, muscles, tendons, and other organs. And due to the drawbacks of the existing chairs, they cannot provide repetitive sitting/standing.

As the aim of this invention was to provide a means to synchronize the chair parts to the person's body parts during the action to overcome the above-mentioned drawbacks, this standing chair is even suitable to be used for a patient in a coma.

Herein forth, there is a clear and present need for a standing chair for disabled persons/patients to automatically or manually move from a sitting position and to standing position with minimal supervision. There is also a need to provide an automatically adjustable standing chair for the disabled persons/patients in accordance with the sitting mode or standing mode of the standing chair. There is also a need to provide a standing chair with straps assemblies that are automatically adjustable for securing the disabled persons/patients during the sitting mode to the standing mode of the standing chair and vice versa. Further, there is also a need to provide a standing chair incorporated with an adjustable foot rest assembly for providing suitable positioning for the disabled person's/patient's feet in accordance with the sitting mode or standing mode of the standing chair. Further, there is also a need to provide a standing chair incorporating a foot rest assembly for exercising the disabled person's/patient's feet and ankle during the process of sitting mode to the standing mode of the standing chair and vice-versa.

SUMMARY OF THE INVENTION

The standing chair comprises a main frame support assembly, at least two collapsible support arms, at least one backrest, at least one seat, at least one drive member and a foot rest assembly. In an embodiment, the main frame support assembly includes a right frame support and a left frame support. In one embodiment, the right frame support and the left frame support are parallelly connected and securely locked via a connecting means. The at least two collapsible support arms having a first end and a second end, the first end of the two collapsible support arms are movably affixed to both right frame support and left frame support, and the second end of the two collapsible support arms are pivotally connected to a backrest support via one or more fasteners.

In one embodiment, at least two collapsible support arms are configured to automatically collapse and retract in accordance with the sitting mode or standing mode of the standing chair. In one embodiment, the backrest is removably positioned on both backrest supports of the right frame support and left frame support. The backrest is securely locked via one or more fasteners. In one embodiment, the seat is securely and removably assembled to the two collapsible support arms. The seat is configured to move in accordance with the two collapsible support arms.

In one embodiment, the drive member is positioned between the right frame support and at least one collapsible support arm on right side of the standing chair. In another embodiment, another drive member is positioned between the left frame support and at least one collapsible support arm on left side of the standing chair. The right side and left side configuration of drive members enable the standing chair to automatically and comfortably raise the at least one collapsible support arm on the right side and left side of the standing chair. In other embodiments, these driving members are replaced or can even be eliminated by at least one air cylinder when the chair is driven manually or using an external lift. In one embodiment, the seat is tilted in accordance with the sitting mode or standing mode of the standing chair using drive members.

In an embodiment, the foot rest assembly includes a pair of leg support bars carrying a foot rest, pivotally and adjustably affixed to both the right frame support and left frame support via one or more fasteners. In one embodiment, the drive members could be, but not limited to, gas cylinders. In another embodiment, the one or more drive members could be, but not limited to, an external lift. The external lift could be detachably assembled to a driving base on a rear portion of the standing chair, thereby automatically and comfortably raising and tilting the seat in accordance with the sitting mode or standing mode of the standing chair using drive members.

In one embodiment, the standing chair further comprises a pair of armrests ergonomically and movably affixed to the backrest. In another embodiment, the backrest is configured to adjust in height and width in accordance with the user requirement. In one embodiment, the standing chair further comprises an automatic backrest adjustment assembly configured to automatically adjust the backrest during the sitting mode. In another embodiment, the standing chair further comprises a chest strap assembly having a chest strap fastened to the backrest of the standing chair.

The standing chair of claim 1, further comprises a waist strap assembly includes a chest strap fastened at the postal end or the arm rest of the standing chair, wherein the chest strap assembly is configured to automatically move up and down in accordance with the sitting mode or standing mode of the standing chair. In another embodiment, the standing chair further comprises a backrest frame accepting a polarity of chest straps at its polarity of positions. In a related embodiment, the standing chair is configured to automatically move up and down in accordance with the sitting mode or standing mode of the standing chair. In one embodiment, the standing chair further comprises a hip strap assembly includes a hip strap fastener, wherein the hip strap assembly is configured to automatically tighten and loosen the hip strap in accordance with the sitting mode or standing mode of the standing chair. In another embodiment, the standing chair further comprises a seat angle adjusting assembly, includes a shaft provided with one or more openings and a stopping plate, wherein the seat angle adjusting assembly configured to enable the user to adjust the seat angle of the standing chair.

In an embodiment, the chest strap assembly is configured to automatically move up and down in accordance with the sitting mode or standing mode of the standing chair or any position in between. In one embodiment, the standing chair further comprises at least one hip strap assembly including a hip strap fastener to which the superior end is pivotally coupled to the backrest supports of the standing chair and from the inferior end is pivotally coupled to the right or left frame support.

In an embodiment, the waist strap assembly is configured to automatically tighten and loosen the waist strap in accordance with the sitting mode or standing mode of the standing chair. In one embodiment, the standing chair further comprises a least hip strap assembly including a hip strap fastened to the backrest supports of the standing chair. In another embodiment, the hip strap assembly is configured to automatically tighten and loosen the hip strap in accordance with the sitting mode or standing mode of the standing chair. In an embodiment, the two collapsible support arms include a first arm and a second arm, wherein the second arm is configured to slidably position into the first arm.

In one embodiment, the connecting means is configured to provide support for the right frame support and left frame support and securely lock within apertures of the right frame support and left frame support via a hand tightening coupling means for the ease of disassembling for portability purposes. In an embodiment, the two collapsible support arms are telescopic support arms. In one embodiment, the foot rests on both right frame support and left frame support are configured to automatically adjust and rotate in a direction according to the user's feet in accordance with the sitting mode or standing mode of the standing chair. In yet another embodiment, the standing chair comprises a seat height adjusting assembly including a shaft provided with one or more openings and a stopping plate, wherein the seat height adjusting assembly configured to enable the user to adjust the seat height of the standing chair.

One aspect of the present disclosure is directed to a standing chair, comprising:

a main frame support assembly includes a right frame support and a left frame support, wherein the right frame support and left frame support are parallelly and reversibly connected and securely locked via a connecting means; at least two collapsible support arms having a first end and a second end, wherein the first end of the two collapsible support arms are movably affixed to both right frame support and left frame support, and the second end of the two collapsible support arms are pivotally connected to a backrest support via one or more fasteners, wherein the two collapsible support arms are configured to automatically collapsible and retractable in accordance with the sitting mode or standing mode of the standing chair; at least one backrest removably positioned on both backrest supports of the right frame support and left frame support and securely locked via one or more easily detachable fasteners; at least one seat securely and removably assembled to the two collapsible support arms, wherein the seat is configured to move in accordance with the two collapsible support arms; one drive member positioned between the right frame support and at least one collapsible support arm on right side of the standing chair, and another drive member positioned between the left frame support and at least one collapsible support arm on left side of the standing chair, thereby automatically and comfortably raise the at least one collapsible support arm on the right side and left side of the standing chair, and tilting the seat in accordance with the sitting mode or standing mode of the standing chair using drive members; and a foot rest assembly includes a pair of leg support bars carrying a foot rest, pivotally and adjustably affixed to both the right frame support and left frame support using one or more fasteners.

In one embodiment, the standing chair further comprises a pair of armrests ergonomically and movably affixed to the backrest, configured to adjust in height and width in accordance with the user requirement. In another embodiment, the standing chair further comprises an automatic backrest adjustment assembly, configured to automatically adjust the backrest while sitting mode of the standing chair. In one embodiment, the standing chair further comprises a chest strap assembly includes a chest strap fastened to the backrest of the standing chair, wherein the chest strap assembly is configured to move up and down in accordance with the sitting mode or standing mode of the standing chair. In another embodiment, the standing chair further comprises at least one hip strap assembly includes a hip strap fastener which from the superior end is pivotally coupled to a backrest support and from the inferior end is pivotally coupled to a second arm of collapsible support arms of the standing chair, wherein the hip strap assembly is configured to automatically tighten and loosen the hip strap in accordance with the sitting mode or standing mode of the standing chair.

In another embodiment, the at least two collapsible support arms include a first arm and a second arm, wherein the second arm is configured to slidably position into the first arm. In another embodiment, the connecting means is configured to provide support for the right frame support and left frame support and securely lock within apertures of the right frame support and left frame support via a coupling mean. In one embodiment, the two collapsible support arms are telescopic support arms. In yet another embodiment, the drive members are gas cylinders. In one embodiment, the foot rests on both right frame support and left frame support are configured to automatically adjust and rotate in a direction according to the user's feet in accordance with the sitting mode or standing mode of the standing chair. In another embodiment, the standing chair further comprises a seat height adjusting assembly, includes a shaft provided with one or more openings and a stopping plate, wherein the seat height adjusting assembly configured to enable the user to adjust the seat height of the standing chair.

Another aspect of the present disclosure is directed to a standing chair, comprising: a main frame support assembly includes a right frame support and a left frame support, wherein the right frame support and left frame support are parallelly and reversibly connected and securely locked via a connecting means; at least two collapsible support arms having a first end and a second end, wherein the two collapsible support arms are telescopic support arms, wherein the first end of the two collapsible support arms are movably affixed to both right frame support and left frame support, and the second end of the two collapsible support arms are pivotally connected to a backrest support via one or more fasteners, wherein the two collapsible support arms are configured to automatically collapse and retract in accordance with the sitting mode or standing mode of the standing chair; at least one backrest removably positioned on both backrest supports of the right frame support and left frame support and securely locked or unlocked via one or more fasteners; at least one seat securely and removably assembled to the two collapsible support arms, wherein the seat is configured to move in accordance with the two collapsible support arms; an external lift detachably assembled to a driving base on a rear portion of the standing chair, thereby automatically and comfortably raising and tilting the seat in accordance with the sitting mode or standing mode of the standing chair using drive members; and a foot rest assembly includes a pair of leg support bars carrying a foot rest, pivotally and adjustably affixed to both the right frame support and left frame support using one or more fasteners.

In one embodiment, the foot rests on both right frame support and left frame support are configured to automatically adjust and rotate in a direction according to the user's feet in accordance with the sitting mode or standing mode of the standing chair. In another embodiment of the standing chair, the standing chair further comprises a seat height adjusting assembly, includes a shaft provided with one or more openings and a stopping plate, wherein the seat angle adjusting assembly configured to enable the user to adjust the seat angle of the standing chair. In one embodiment, the seat angle refers to the seat height.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

FIG. 16A shows a perspective view of the automatic backrest adjustment assembly with a pair of armrests according to one embodiment;

FIG. 16B shows a perspective view of the automatic backrest adjustment assembly with a pair of armrests in a folding position according to one embodiment;

FIG. 17 shows an exploded view of the armrest assembly according to one embodiment;

FIG. 18 shows an exploded view of a foot rest assembly of the standing chair according to one embodiment;

FIG. 19 shows a perspective view of a foot rest assembly of the standing chair according to one embodiment;

FIGS. 20A-20E show a perspective view of a foot rest assembly adjusted at different angles according to one embodiment;

FIG. 25 shows a side view of the supporting plate of the automatic knee adjustment supporting assembly in an extending position of the standing chair according to another embodiment;

DETAILED DESCRIPTION

The present invention relates to a standing chair and more particularly relates to a standing chair configured to support a person or patient in sitting and standing positions in accordance to a sitting mode or a standing mode of the standing chair.

A description of embodiments of the present invention will now be given with reference to the figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
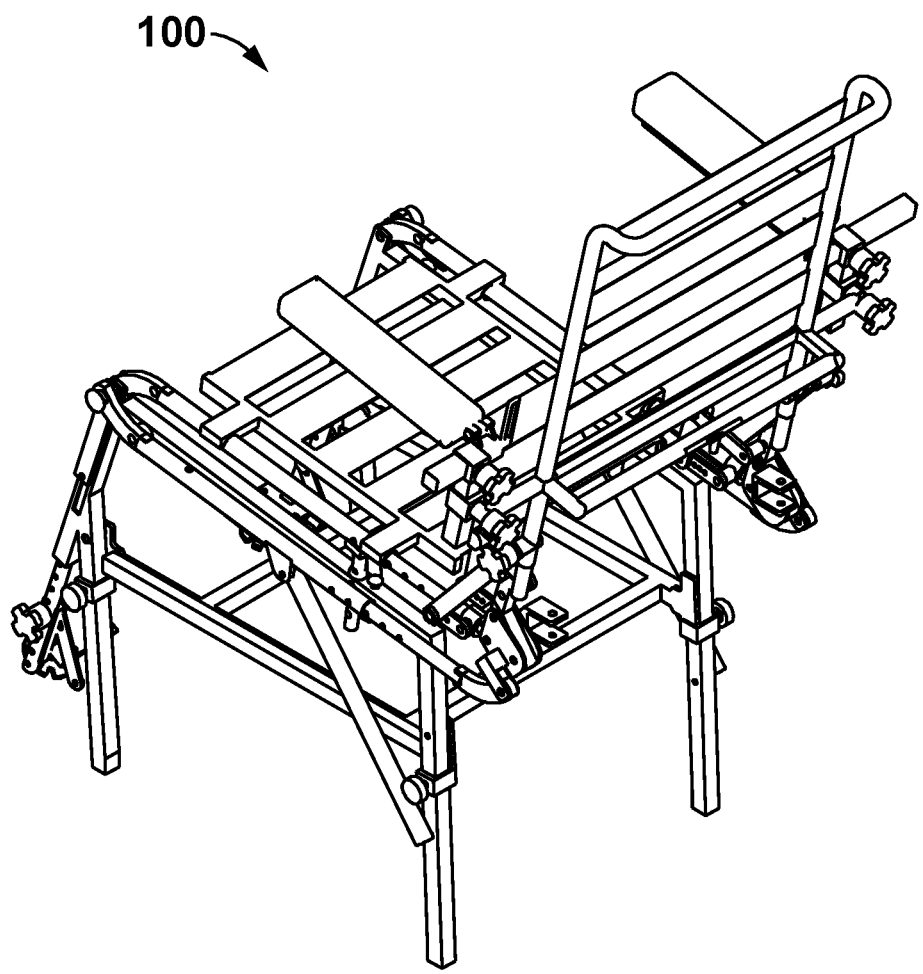
FIG. 1 illustrates a perspective view of a standing chair in a sitting mode according to one embodiment.
Figure 2:
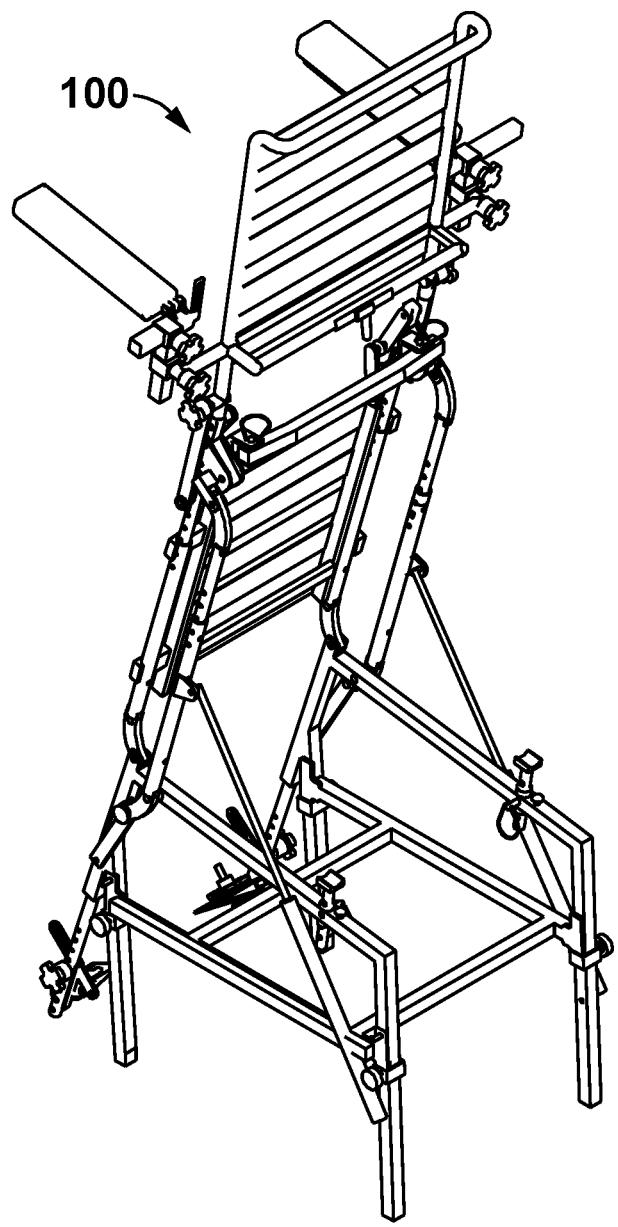
FIG. 2 illustrates a perspective view of the standing chair in a standing mode according to one embodiment.
Figure 3:
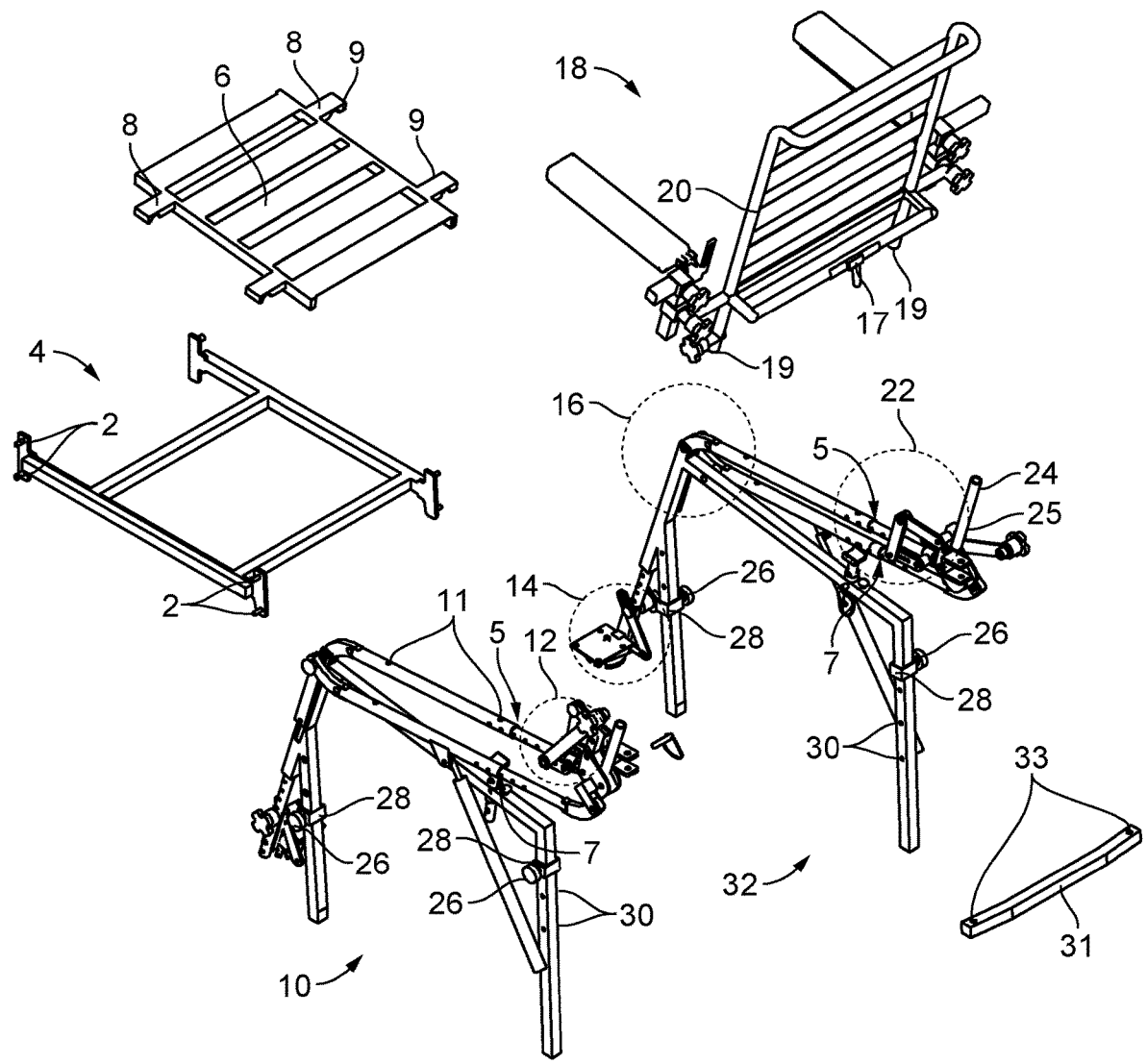
FIG. 3 illustrates an exploded view of the standing chair according to one embodiment.

Referring to FIGS. 1-3, a standing chair 100 used for supporting a patient or user in a sitting mode and a standing mode or any other mode in between these modes. In one embodiment, the standing chair 100 is configured to support the patient or user while moving from a sitting position to a standing position in accordance to a sitting mode or a standing mode, or any mode in between them, of the standing chair 100. In one embodiment, the standing chair 100 comprises a main frame support assembly, at least two collapsible support arms (5 and 7), at least one seat or buttock support section 6, at least one backrest or upper trunk support section 18, one or more drive members 36, and a foot rest assembly 14.

In one embodiment, the main frame support assembly includes a left frame support 10 and a right frame support 32. The left and right frame support (10 and 32) are parallelly and reversibly connected and securely locked and easily unlocked via a connecting means 4. In one embodiment, the connecting means 4 includes a plurality of guide pins 2 on both sides. The guide pins 2 could be inserted into apertures 30 of the left and right frame supports (10 and 32) and securely lock the connecting means 4 to the main frame support assembly of the standing chair 100 via one or more fasteners, for example, a coupling mean or slidable locking member 28. The coupling means 28 includes a hand knob 26 to easily and reversibly unify the left and right frame supports (10 and 32).

In one embodiment, at least two collapsible support arms (5 and 7) having a first end and a second end. The first end of the two collapsible support arms (5 and 7) are movably affixed to the left and right frame supports (10 and 32), and the second end of the two collapsible support arms (5 and 7) are pivotally connected to a backrest supports 25 via one or more fasteners, wherein the two collapsible support arms (5 and 7) are configured to automatically collapsible and retractable in accordance with the sitting mode or standing mode of the standing chair 100.

In one embodiment, the standing chair 100 further comprises a backrest frame 20. The backrest frame 20 could be removably mounted on shafts 24 of the backrest supports 25 on both sides of the standing chair 100. The backrest frame 20 further comprises holes 19 for reversibly receiving the shafts 24 of the backrest supports 25. The backrest frame 20 is configured to securely hold the backrest 18. In one embodiment the backrest comprises an external lift attaching element 17. In one embodiment, the seat or buttock support section 6 includes a mounting means 8 with a fastening member or pin 9 at four corners. The fastening members 9 of the seat 6 could be inserted into the apertures 11 of the at least one collapsible arm 5 on both right and left sides of the standing chair 100. In one embodiment, the backrest frame 20 accepts a chest strap support in its various level according a user requirement and further comprises a driving base 31. The driving base 31 is configured to enable for self-driving, manual-driving, or proving support for an external lift.

In one embodiment, the foot rest assembly 14 is slidably enter into both the left and right frame supports (10 and 32). In one embodiment, the standing chair 100 further comprises an automatic backrest adjustment assembly 12, an automatic knee adjustment supporting assembly 16, and an automatic hip strap adjustment assembly 22. In one embodiment, the user or patient has a significantly more accommodating angle which going to a standing position while reducing the possibility of accidental fallings.

Figure 4:
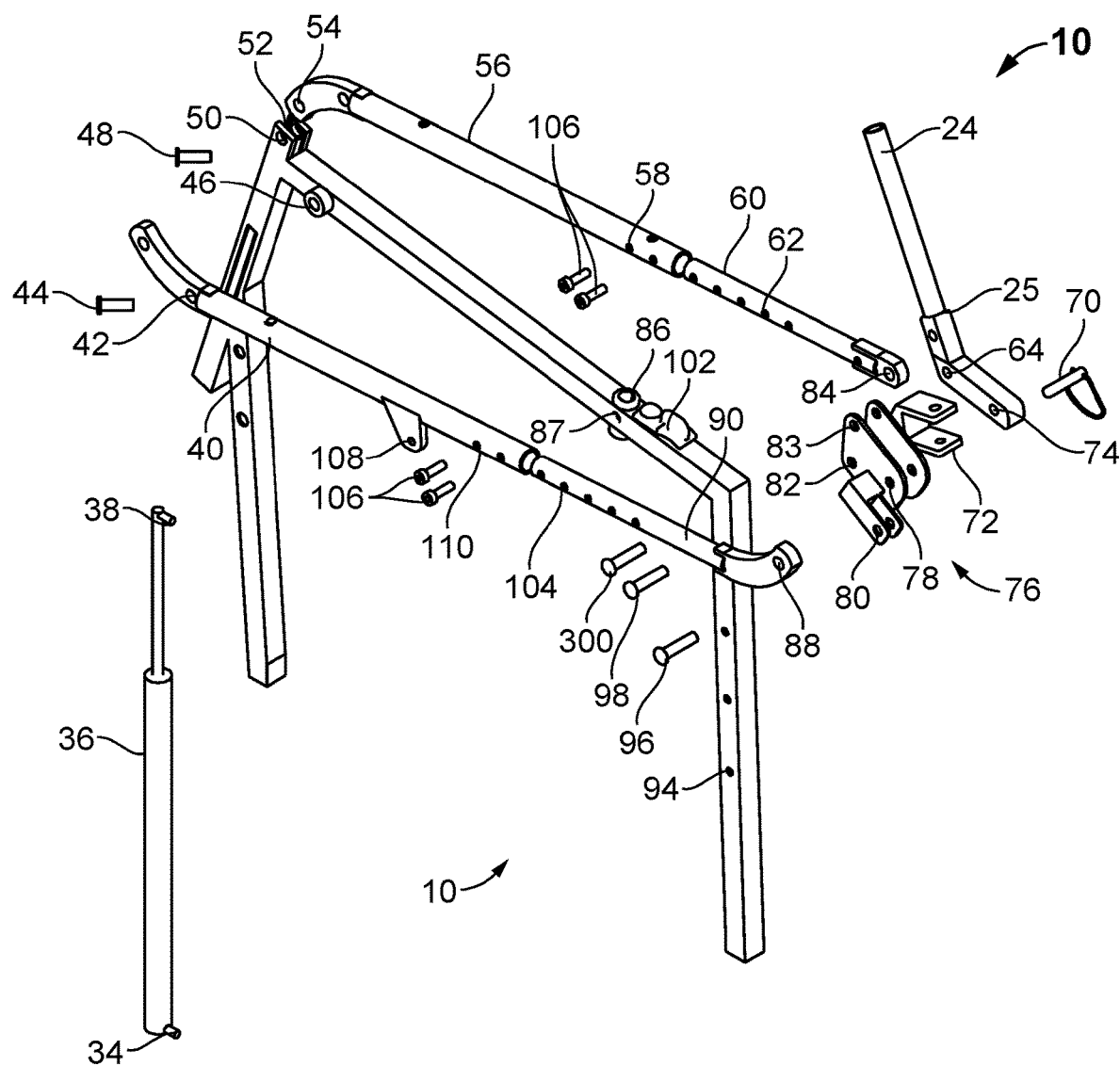
FIG. 4 shows the exploded view of a left frame support and collapsible arms of the standing chair according to one embodiment.

Referring to FIG. 4, the standing chair 100 further comprises one or more drive members 36. In one embodiment, the drive member 36 could be positioned between the left frame support 10 and at least one collapsible support arm 7 on the left side of the standing chair 100. The drive member 36 includes swivel screws (34 and 38) at both ends and could be mounted between the left frame support 10 and the at least one collapsible support arm 7 via holes (94 and 108).

In one embodiment, the collapsible support arm 7 includes a first arm 40 and a second arm 90. The second arm 90 is configured to slidably position within the first arm 40. In one embodiment, the first arm 40 and second arm 90 comprises a plurality of holes (110 and 104) and could be locked via fasteners, for example, screws 106. In one embodiment, the collapsible support arm 7 is further configured to automatically collapsible and retractable in accordance with the sitting mode or standing mode of the standing chair 100 and based on the user requirement, for example, user's height.

In one embodiment, the first arm 40 of the collapsible support arm 7 could be pivotally connected to the left frame support 10 via a hole 46 and locked via a fastening member or pin 44. The fastening member 44 could be inserted via an aperture 42 of the first arm 40 for locking the collapsible support arm 7 to the left frame support 10. In one embodiment, one end of the second arm 90 of the collapsible arm 7 could be slidably positioned in the first arm 40 via holes (104 and 110)) for the purpose of being adjusted based on the user requirement, e.g., user's height with a fastener 106, for example, but not limited to, a screw and other end of the second arm 90 could be pivotally coupled to a joint member 76 via holes (88 and 80) and secured by a fastener 96, for example, but not limited to, a screw.

In one embodiment, the other collapsible arm 5 of the left frame support 10 of the standing chair 100 further comprises a first arm 56 and a second arm 60. The second arm 60 is configured to slidably position within the first arm 56. In one embodiment, the first arm 56 and second arm 60 comprises a plurality of holes (58 and 62)) for the purpose of being adjusted based on the user requirement, for example, user's height and could be locked via fasteners, for example, screws 106. In one embodiment, the collapsible support arm 5 is further configured to automatically collapsible and retractable in accordance with the sitting mode or standing mode of the standing chair 100 and based on the user requirement, for example, user's height.

In one embodiment, the first arm 56 of the collapsible support arm 5 could be pivotally connected to the left frame support 10 via a slot 52 and holes (50 and 54) and locked via a fastening member 48, for example, a pin or a screw. The fastening member 48 could be inserted via the holes (50 and 54) and the slot 52 of the left frame support 10 for locking the collapsible support arm 5 to the left frame support 10. In one embodiment, one end of the second arm 60 of the collapsible arm 5 could be slidably positioned in the first arm 56 via holes (62 and 58)) for the purpose of being adjusted based on the user requirement, for example, user's height with a fastener 106, for example, but not limited to, a screw and other end of the second arm 60 could be pivotally coupled to a joint member 76 via holes (88 and 80) and secured by a fastener 98, for example, but not limited to, a screw.

In one embodiment, the backrest support 25 include a shaft 24 with holes or apertures (64 and 74) and pivotally coupled to the joint member 76 via the hole 84 of the second arm 60 of the collapsible support arm 5 using a fastener 300, for example, a screw when the joint member 76 is aligned and interlocked to the backrest support 25 via the holes (83 and 74) using the fastener 70, for example, a screw. In one embodiment, the driving base or lifting handle 31 (shown in FIG. 3) could removably be inserted to a receiving member 72. The receiving member 72 could be connected to the left frame support 10 via the holes (86 and 87) using a fastener. The driving base 31 is configured to enable for self-driving, manual-driving, or proving support for an external lift.

In one embodiment, the assembly of the right frame support 32 is similar to the assembly of the left frame support 10. In one embodiment, another drive member 36 could be positioned between the right frame support 32 and at least one collapsible support arm 7 on the right side of the standing chair 100, thereby automatically and comfortably raising the at least one collapsible support arm 7 on the right side and left side of the standing chair 100, and tilting the seat 6 in accordance with the sitting mode or standing mode of the standing chair 100 using the drive members 36 on both sides of the standing chair 100.

Figure 5:
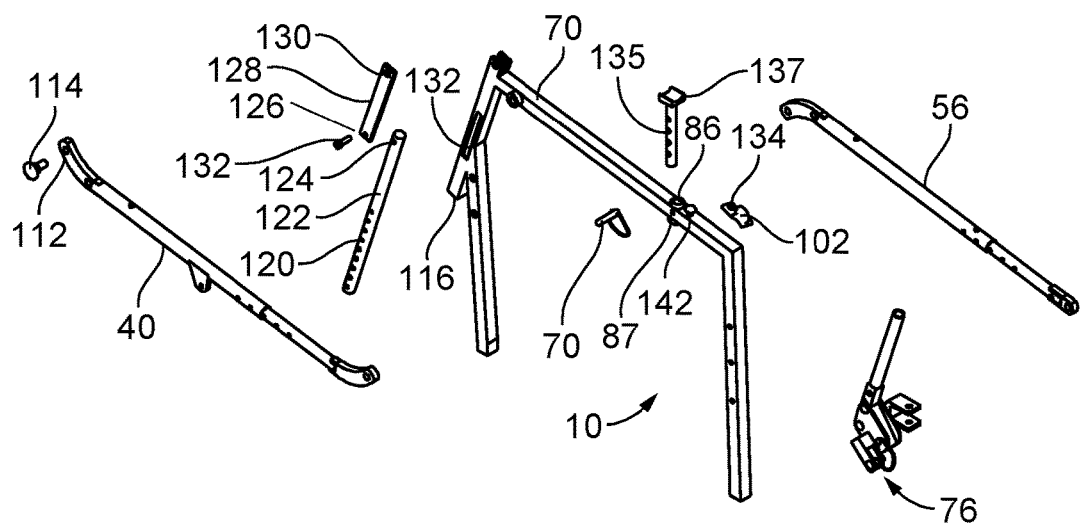
FIG. 5 shows the exploded view of the left frame support and collapsible arms of the standing chair according to one embodiment.
Figure 6:
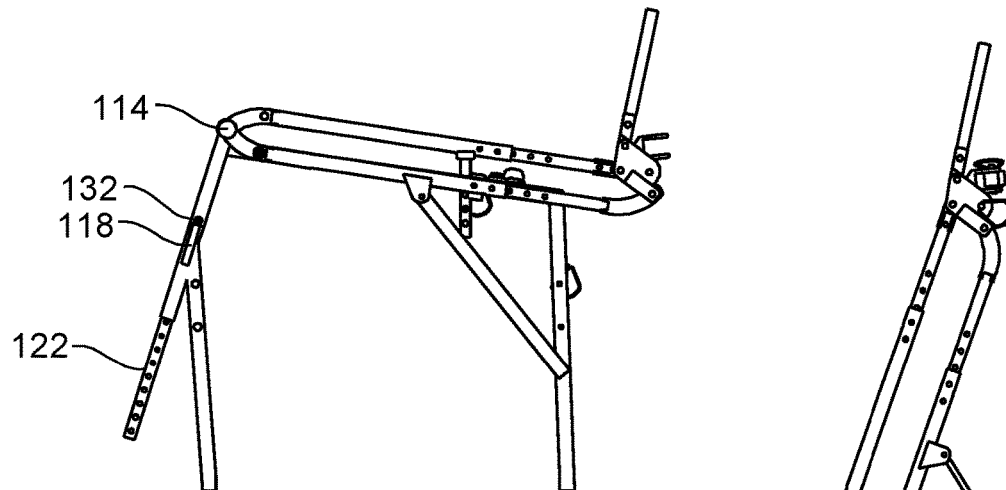
FIG. 6 shows a perspective view of the left frame support and collapsible arms of the standing chair in the sitting mode according to one embodiment.
Figure 7:
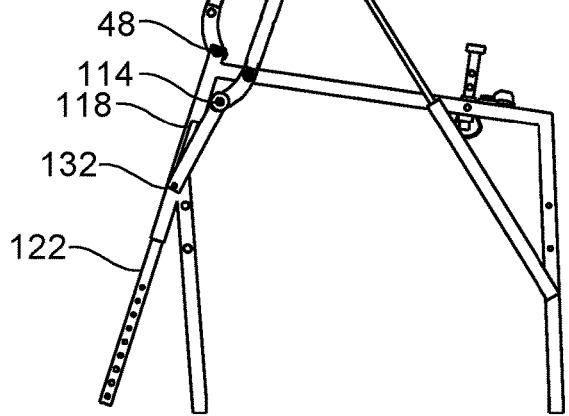
FIG. 7 shows a perspective view of the left frame support and collapsible arms of the standing chair in the standing mode according to one embodiment.

Referring to FIGS. 5-7, the standing chair 100 further comprises an automatic knee adjustment supporting assembly. In one embodiment, the automatic knee adjustment supporting assembly comprises a guide 116, configured to receive a shaft 122 and secured using the fastener 132. In one embodiment, the automatic knee adjustment supporting assembly further comprises a supporting plate 128. The supporting plate 128 includes a hole (126 and 130) at a bottom portion and a top portion. One end of the supporting plate 128 pivotally coupled to the first arm 40 of the collapsible arm 7 via holes (112 and 130) using a fastener 114, for example, a hook and another end could be pivotally coupled to the shaft 122 via a hole 126, a cut 132, and a tap 124 using a fastener 132, for example, a cut 132 after the shaft 122 is passed through the guide 116 using a mean 125. The fastener 114 could be used for receiving a mean of accepting a knee supporting element.

In one embodiment, the standing chair 100 further comprises a seat height adjusting assembly, configured to enable the user to adjust the seat 6 (shown in FIG. 3) of the standing chair 100. In one embodiment, the seat angle adjusting assembly comprises locking system 102. The locking system 102 is rotatably coupled to the left frame support 10 via the holes (134 and 142). In one embodiment, the seat angle adjusting assembly further comprises a shaft 135 provided with one or more openings and a stopping plate 137. The shaft 135 could be positioned into the hole 86 of the left frame support 10 and locked at different heights using a fastener 70 via the hole 87, thereby adjusting the seat 6 at different angle using the seat angle adjusting assembly. In one embodiment, the assembly of the seat angle adjusting assembly on the left frame support 10 is similar for the right frame support 32.

Figure 8:
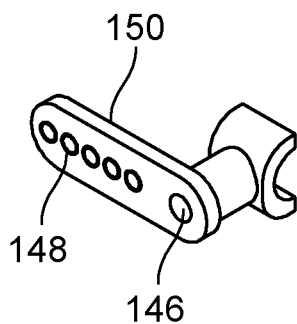
FIG. 8 shows a perspective view of a stationary arm of a hip strap assembly according to one embodiment.
Figure 9:
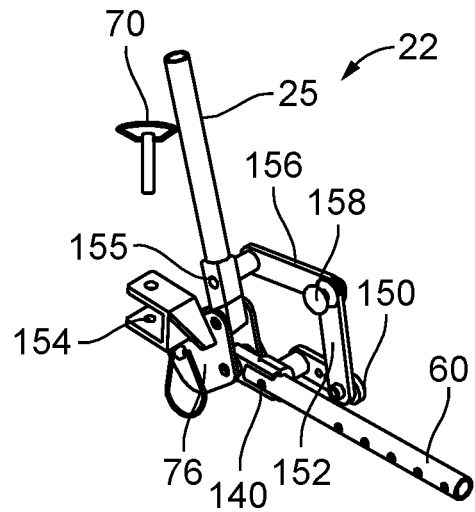
FIG. 9 shows a perspective view of the hip strap assembly and relation to a backrest and a seat according to one embodiment.

Referring to FIGS. 8-9, the standing chair 100 further comprises a hip strap assembly 22. In one embodiment, the hip strap assembly 22 includes a stationary arm 150 and a waist strap. The hip strap assembly 22 is configured to automatically tighten and loosen the hip strap in accordance with the sitting mode or standing mode of the standing chair 100. The stationary arm 150 could be positioned to the second arm 60 of both collapsible arms 5 (shown in FIG. 3) on both sides of the standing chair 100 via holes (140 and 146) of each respectively. In one embodiment, the stationary arm 150 comprises several tapped holes 148 and using any one of them would determine the extent of its auto adjustability and provides a wider range of adjustment.

The hip strap assembly 22 may further comprise at least two supporting arms (152 and 156). One end of the supporting arm 152 could be pivotally connected to the stationary arm 150 via the hole 146 and another end could be pivotally connected to the one end of the other supporting arm 156 via a fastener 158, for example, a hook. The other end of the supporting arm 156 could be pivotally coupled to the backrest support 25 via a hole 155.

Figure 10:
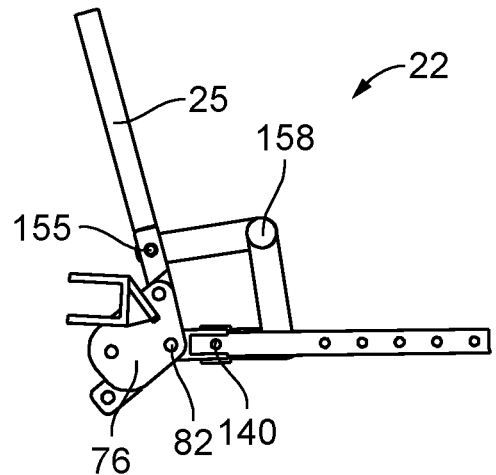
FIG. 10 shows a side view of the hip strap assembly and relation to the backrest and the seat of the standing chair in sitting mode according to one embodiment.
Figure 11:
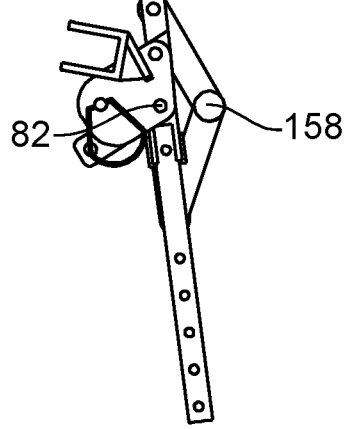
FIG. 11 shows a side view of the hip strap assembly and relation to the backrest and the seat of the standing chair in standing mode according to one embodiment.

Referring to FIGS. 10-11, the side view of the hip strap assembly 22 is disclosed. In one embodiment, the distance between the hook 158 from the hole 82 of the joint 76 is long when the standing chair 100 in a sitting mode or position. In one embodiment, the distance between the hook 158 from the hole 82 of the joint 76 is shorter when the standing chair 100 in a standing mode or position.

Figure 12:
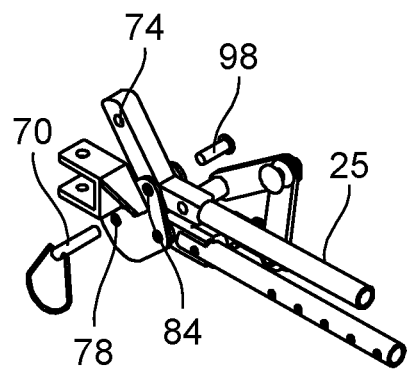
FIG. 12 shows a perspective view of the backrest support in a foldable position for the ease in portability according to one embodiment.

Referring to FIG. 12, the backrest support 25 in a folding position is disclosed. In one embodiment, the backrest support 25 is configured to simply fold and open or unfold using the fastener 70, for example, a screw, thereby requiring a lesser space for storing the standing chair 100, for example, in a trunk of a car.

Figures 13, 14:
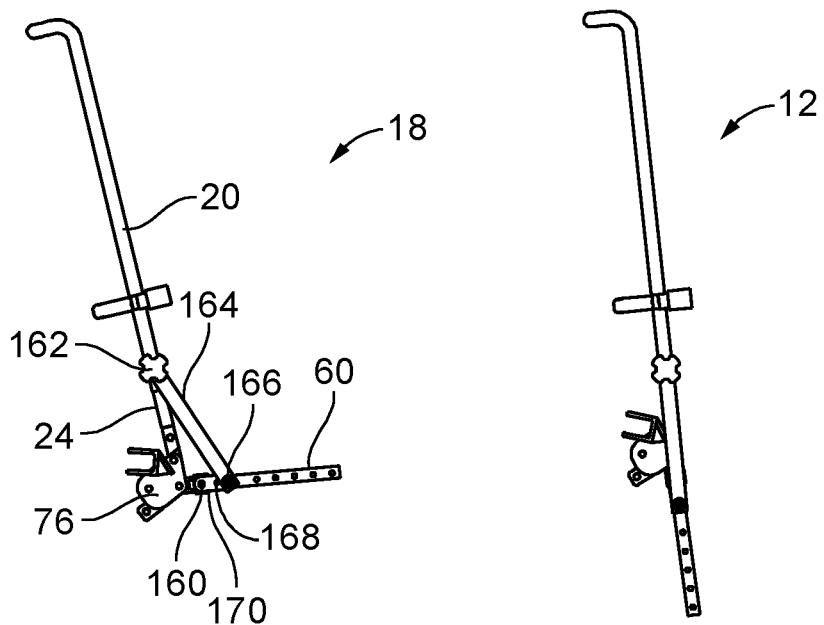
FIG. 13 shows a side view of an automatic backrest adjustment assembly of the standing chair in a sitting mode according to one embodiment.
FIG. 14 shows a side view of the automatic backrest adjustment assembly of the standing chair in a standing mode according to one embodiment.

Referring to FIG. 13, the standing chair 100 further comprises an automatic backrest adjustment assembly 12 when the standing chair is in a sitting mode. The automatic backrest adjustment assembly 12 is configured to automatically adjust the backrest 18 in accordance with the sitting mode or standing mode of the standing chair 100. In one embodiment, the automatic backrest adjustment assembly 12 includes a stationary arm 170. The stationary arm 170 could be affixed to the second arm 60 of both collapsible arms 5 (shown in FIG. 3) on both sides of the standing chair 100 via a hole 160 when aligned with the tapped hole of 140 of the second arm 60. In one embodiment, the stationary arm 170 further comprises several holes 168. In one embodiment, the automatic backrest adjustment assembly 12 further includes a supporting bar 164. One end of the supporting bar 164 could be pivotally connected to one of the polarity of holes 168 of the stationary arm 170 and the other end could be pivotally and reversibly couples to the backrest frame 20 via a hole 172 and secured via a fastener 162, for example, a hand knob.

Figures 15A, 15B:
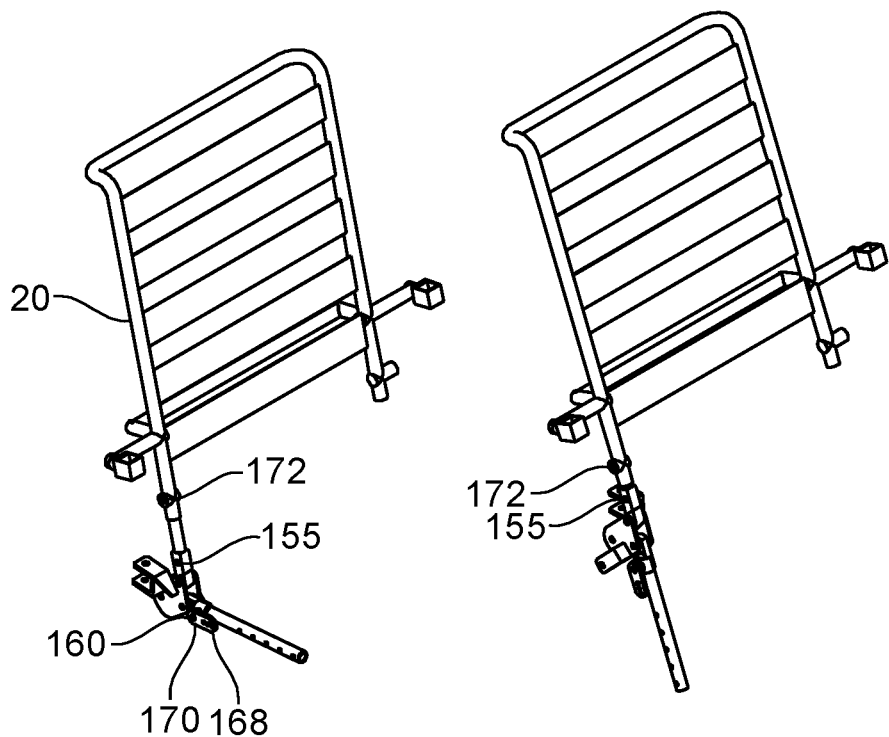
FIG. 15A shows a perspective view of the automatic backrest adjustment assembly of the standing chair in a sitting mode to depict the relation between the backrest and a point on a backrest support which is farthest according to one embodiment.
FIG. 15B shows a perspective view of the automatic backrest adjustment assembly of the standing chair in a standing mode to depict the relation between the backrest and a same point of FIG. 15 A on a back rest support which is closest according to one embodiment.

Referring to FIG. 14, the side view of the automatic backrest adjustment assembly 12 is disclosed when the standing chair is in a standing mode. The automatic backrest adjustment assembly 12 enables the backrest 18 in accordance with the standing mode of the standing chair 100. Referring to FIG. 15A, the automatic backrest adjustment assembly 12 configured to move the backrest 18 in accordance with the sitting mode of the standing chair 100. Referring to FIG. 15B, the automatic backrest adjustment assembly 12 configured to move the backrest 18 in accordance with the standing mode of the standing chair 100. In one embodiment, the distance between the hole 155 from the hole 172 of the backrest frame 20 is increased when the standing chair 100 is in sitting mode and the distance between the hole 155 from the hole 172 of the backrest frame 20 is decreased when the standing chair 100 is in standing mode. This is to compensate for the difference in the length of the postal line of a person in sitting versus standing mode. For a fine adjustment according to a user's requirement. The distance between the hole 155 from the hole 172 of the backrest frame 20 could be changed by changing the position of the supporting bar 164 (shown in FIG. 13) to any one of the polarity of holes 168 of the stationary arm 170.

Referring to FIGS. 16A-16B, the standing chair 100 further comprises a pair of armrests 174. In one embodiment, the armrests 174 could be ergonomically and movably affixed to the backrest frame 20. The armrests 174 are configured to adjust in height and width in accordance with the user requirement. The armrests 174 could be manually and easily moved to upwards and downwards using at least one fastener, for example, a knob.

Referring to FIG. 17, an assembling of the armrest 174 is disclosed. The armrest assembly includes a bracket 176 with a knob 180, affixed to a lower portion of both sides of the backrest frame 20. The armrest assembly further includes a shaft member 188 provided with a bracket 190 and a knob 178. In one embodiment, the shaft member 188 could be slidably and vertically positioned into the bracket 176 and secured using the knob 180 for adjusting the height of the armrest 174 in accordance with the user requirement. In one embodiment, the bracket 190 is configured to receive a horizontal shaft member 186. The horizontal shaft member 186 could be hingedly connected to one end of the armrest 174 for enabling upward movements.

Referring to FIG. 18, the foot rest assembly 14 includes a pair of foot rest support bars 232 with extension members 234 on both sides of the standing chair 100. In one embodiment, a foot rest 202 could be pivotally attached to the extension member 234 of the foot rest support bar 232. The foot rest 202 could be adjusted in accordance of the user requirement using a fastener 194, for example, a knob. In one embodiment, the foot rest assembly 14 further comprises a holding member 220 having a stem 222 at frontal and approximate inferior with a tapped hole on its centerline and a shaft 224 at approximate posterior of the holding member 220. In one embodiment, the holding member 220 has a contoured shape that positioned over the shaft 122 via any of the polarity of holes 120.

The holding member 220 includes a hole 218 at approximate superior and the shaft 224 of the holding member 220 is coupled to the shaft 122 via the holes 218 and any of the polarity of holes 120. In one embodiment, the foot rest assembly 14 further comprises a plate member 212. One end of the plate member 212 could be pivotally and slideably coupled to the shaft 122 of the foot rest assembly 14 via a cut 214 and any of the polarity of holes 120 and secured using at least two fasteners (228 and 208), for example, a hand-tighten knot and a screw, and the other end of the plate member 212 could be pivotally connected to foot rest support bar 232 via the holes (230 and 206).

The fastener 208 includes a head portion with a square notch 210 with a dimension proportional to the width and the depth of the slot 214 to prevent the screw form turning when the hand-tighten knot 228 is turned for tightening or untightening purpose. In one embodiment, there is a semicircle cut 216 adjacent to the slot 214 for easy setting of the foot rest assembly to the home position. In one embodiment, the extension member 234 of the foot rest support bar 232 could slid onto the stem 222 of the holding member 220 and secured via the hole 198 of the extension member 234 using a fastener 400 and pivotally coupled to the tapped hole of the stem 222 thus the foot rest 202 could rotate around its axis, a frontward and a backward and vice versa. The foot rest assembly 14 on both sides of the standing chair 100 are similar. The extension member 234 of the foot rest support bar comprises a tabbed hole 196 for receiving a hand-tighten knot 194 for the purpose of turning the foot rest 202 to the left or right or in and out.

Referring to FIG. 19, the perspective view of the foot rest assembly 14 is disclosed. The foot rest assembly 14 could loosen and tighten for adjustment via a fastener, for example, a hand-tightening knot 228 and rotating the foot rest or plate 202 for a desired angle and tighten the fastener after setting a suitable position of the foot rest 202 for a patient with contracture or when it is desired to stretch muscles and/or tendons such as the Achilles when the standing chair 100 is in a partial or a full standing position. When a half circle 216 is aligned with the fastener 208, the foot is in a home position which is perpendicular to the shins.

FIGS. 20A-20C depict a side view of the foot rest assembly 14 that could be positioned at different angles to the front or back in accordance with the user requirement. In one embodiment, the foot rest assembly 14 could change the position of the foot rests 202 (shown in FIG. 20B) at a home position.

FIGS. 20D-20E depict a side view of the foot rest assembly 14 that could be positioned at different angles side to side in accordance with the user requirement.

Figure 21:
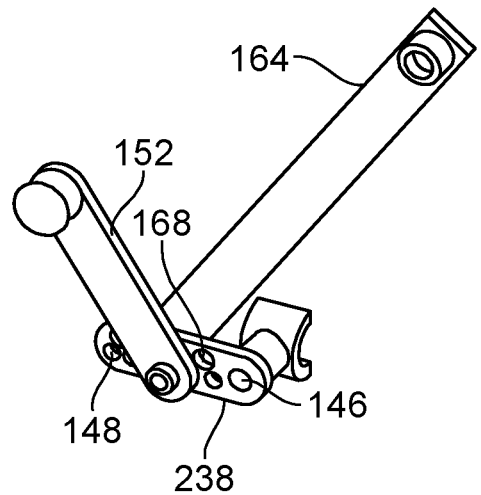
FIG. 21 shows a perspective view of a stationary arm of the standing chair according to another embodiment.
Figure 22:
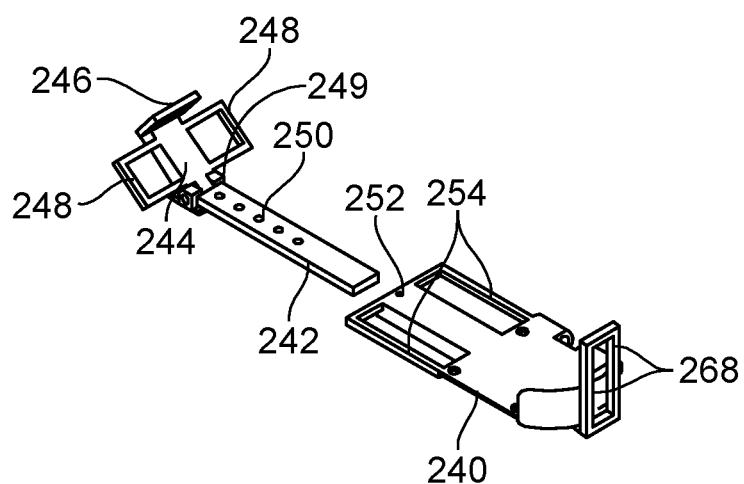
FIG. 22 shows an exploded view of the foot sole support of the standing chair according to another embodiment.

Referring to FIG. 21, the standing chair 100 further comprises a stationary arm 238 in another embodiment of the present invention. The stationary arm 238 could be used by replacing the stationary arms (150 and 170). Referring to FIG. 22, the standing chair 100 further comprises a foot sole support 240 in another embodiment of the present invention. The foot sole support 240 comprises fastener loops (254 and 268). The fastener loops (254 and 268) could enable the user to fastening straps, for example, a Velcro® for securely holding the user's feet onto the foot sole support 240. The foot rest assembly 14 may further comprise a toe support member 244.

Figure 23:
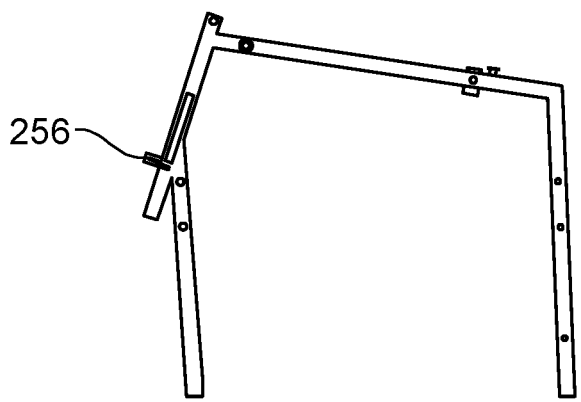
FIG. 23 shows a side view of the left frame support of the standing chair according to another embodiment.

The toe support member 244 further comprises a toe fastener strap loop or mean 248 for securely supporting the user's toes and a loop or mean 246 that enable the user to fasten straps, for example, a Velcro® to a loop or member 256 of FIG. 23 for the purpose of exercising and stretching the user's toes. In this auto acting mechanism, where the standing chair 100 is in a sitting mode the toes are in a relaxed position but they are in a stretched upward position when in a partial or full standing mode of the standing chair 100. The extent of stretching is determined by a user requirement by loosening or tightening the said fastening straps. In one embodiment, the toe support member 244 further comprises an extension portion 242 with a plurality of holes 250. The extension portion 242 of the toe support member 244 could be slidably inserted into a provision of the foot sole support 240 and locked using a fastener via the hole 252 of the foot sole support 240 and at least one hole 250 of the extension portion 242 of the toe support member 244 in accordance with the user requirement for example, the user shoe size.

Figure 24:
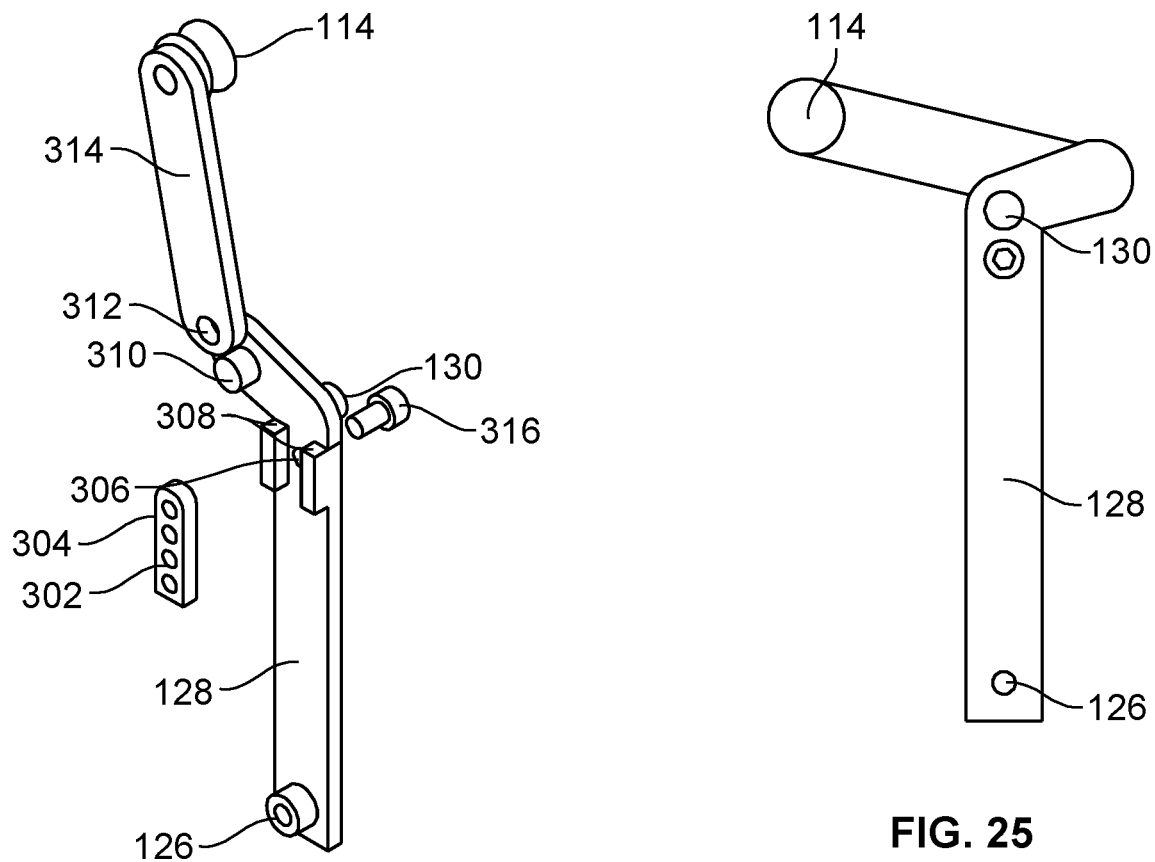
FIG. 24 shows a perspective view of the supporting plate of the automatic knee adjustment supporting assembly of the standing chair according to another embodiment.

Referring to FIG. 23, the side view of the left frame support 10 in another embodiment of the present invention is disclosed. In another embodiment, the left frame support 10 and right frame support 32 couple be provided with a strap receiving element 256 for receiving the toe exercise member 246. Referring to FIG. 24, the supporting plate 128 of the automatic knee adjustment supporting assembly is disclosed in another embodiment of the present invention. The supporting plate 128 includes a hole (126 and 130) at a bottom portion and a top portion. The supporting plate 128 further comprises midpoint guides 308 and an aperture 306. In one embodiment, a retracting arm 314 could be pivotally attached to the supporting plate 128 via a hole 126 and connecting to a receiving means 310 of the supporting plate 128. The automatic knee adjustment supporting assembly may further comprise an adjustable stopper 304.

The adjustable stopper 304 comprises one or more tapped holes 302. The adjustable stopper 304 could be removably attached to the supporting plate 128 via the holes (302 and 306) and secured using a fastener 316, for example, a bolt, thereby determining the amount of rotation of the extending retracting arm 314. Referring to FIG. 25, the side view of the extending retracting arm 314 in an extending position in one embodiment of the present invention.

Figure 26:
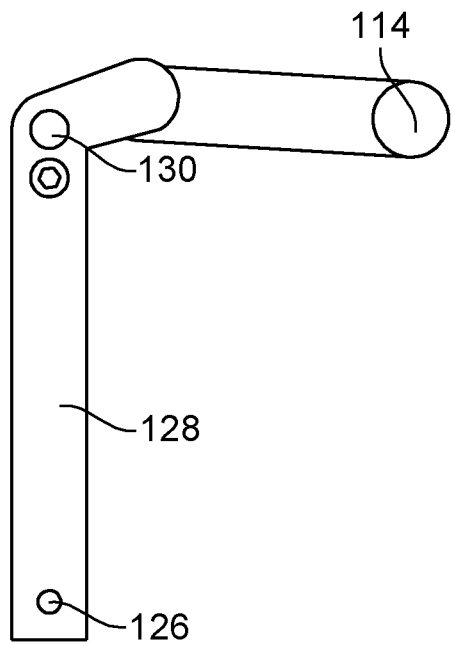
FIG. 26 shows a side view of the supporting plate of the automatic knee adjustment supporting assembly in a retracted position of the standing chair according to another embodiment.

Referring to FIG. 26, the side view of the extending retracting arm 314 in a retracting position in one example of the present invention.

Figure 27:
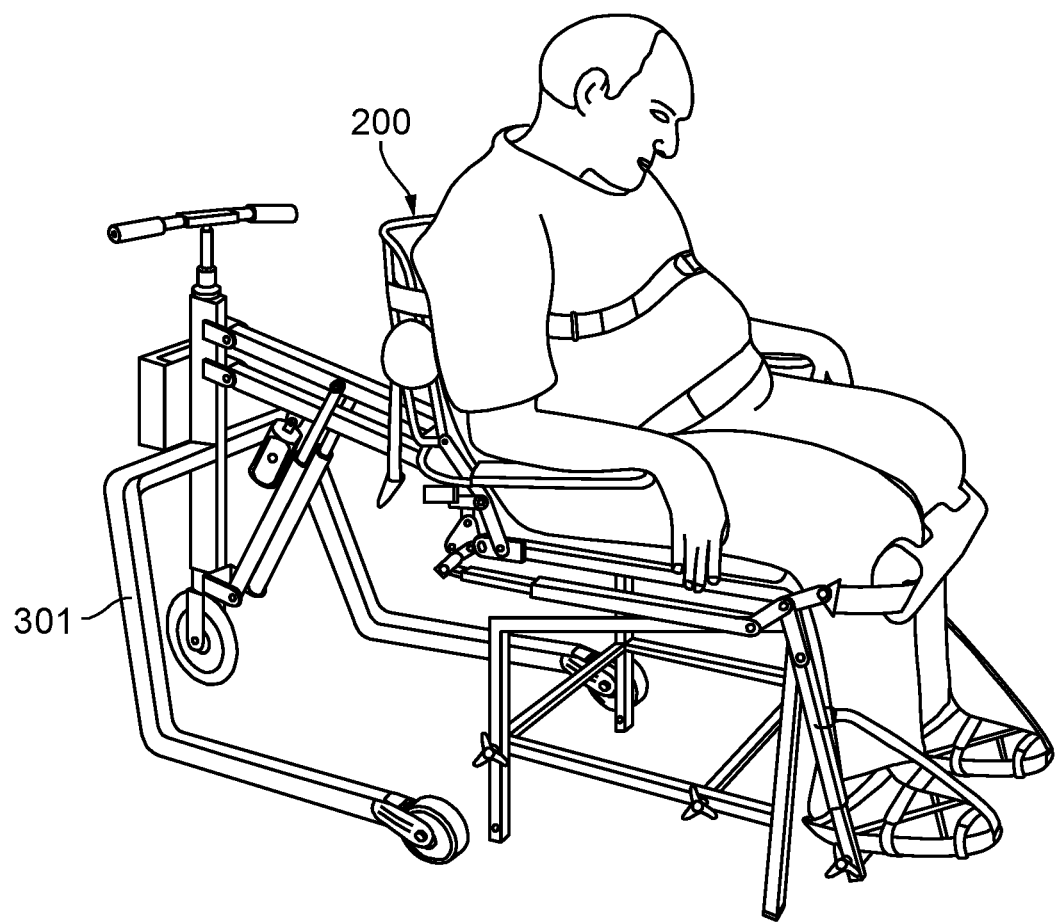
FIG. 27 shows a perspective view of the standing chair uses an external lift according to another embodiment.
Figure 28:
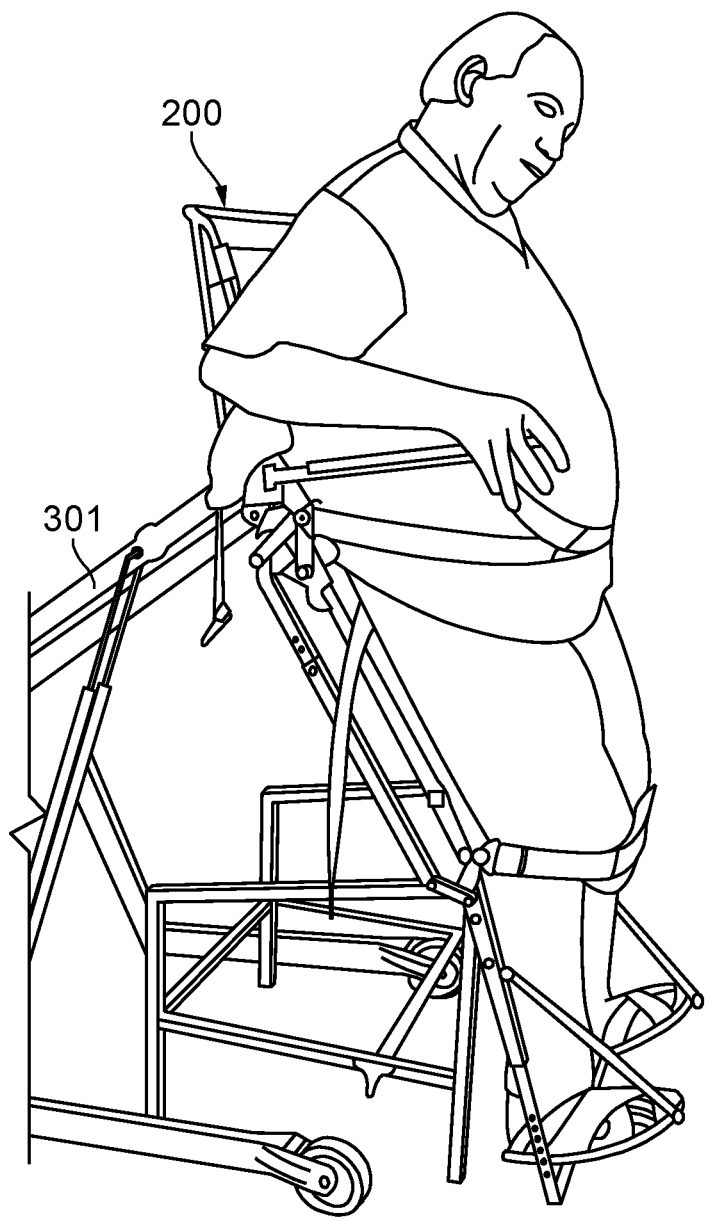
FIG. 28 shows a perspective view of the standing chair in a standing mode using the external lift according to another embodiment.

Referring to FIGS. 27-28, a standing chair 200 uses an external lift 301. In another embodiment, the standing chair 100 could be changed from the sitting mode to standing mode using the external lift 301. In one embodiment, the standing chair 301 is not provided with any other drive members. In one embodiment, the external lift 301 could be removably affixed to the driving base 31 (shown in FIG. 3). The driving base 31 is configured to enable for self-driving, manual-driving, or proving support for the external lift 301 during the standing mode or position of the standing chair 200.

A method for using the standing chair 100 is disclosed. At one step, the all components, for example, the collapsible bars (5 and 7) to the left frame support 10 and right frame support 32 of the standing chair 100 are assembled in a manner using fasteners. At another step, the length of the patient upper leg is measured while sitting on the seat 6 (shown in FIG. 3). This obtained measurement will be used to set the length of the combination of the collapsible arms (5 and 7) of both left frame support 10 and right frame support 32 of the standing chair 100. At another step, the distance from where the knee bends while in a sitting position to the bottom of the user's heel where it is resting on a flat surface and set the hole 218 of the holding member 220 of the foot rest assembly 14 to the proper hole 120 of the shaft 122 of the automatic knee adjustment supporting assembly. At another step, the foot rests 202 are adjusted at a desired angle in accordance with the user requirement.

At another step, the armrests 174 are adjusted in accordance with the user requirement. At another step, the supporting arm 152 of the hip strap assembly 22 is adjusted by setting several tapped holes 148 of the stationary arm 150. At another step, the automatic backrest adjustment assembly 12 is adjusted by setting the supporting bar 164 on proper hole 168 of the stationary arm 170. At another step, the standing chair 100 is raised slowly to standing position in a controlled manner and check to see if the hip strap or belt is automatically adjusted properly. If it is getting loose in the standing position, repeat the step 7 and choose another hole 148 of the supporting arm 150 of the hip strap assembly 22. If the hip strap or belt is getting tight, then choose a hole 148 a closer distance to the hole 160.

At another step, the range of movement of the backrest or upper trunk support 18 is observed with respect to the patient's back. If there is a need for expanding this range, use the hole 168 of the stationary arm 170 further away from hole 160. At another step, the fastening straps, for example, Velcro® is tightened via the fastening loops (254 and 268) to provide support for the user's ankles and when the user or patient is in the sitting position, loosely connect the fastening straps via the Velcro® toe exercise 246 of the toe support member 244 to the strap receiving element 256 of the alternative left frame support 10 and right frame support 32. During the standing process of the standing chair 100, the distance between the Velcro® toe exercise 246 and the strap receiving element 256 increases thus pulling the toe in an upward direction and when returning will release the toe to the normal position for exercising the toe and preventing contracture. Further, at step, the standing chair 100 has been setup for a repetitive operation of sitting and standing modes. To get the most benefit, it is better that the footrests 174 are at different angles to exercise different muscles in the lower limbs for the user or patient.

Advantageously, the standing chair 100 is comprised of at least four main sections that can be engaged and disengaged without the need of any tools. After being disengaged, the pieces can be stowed together or separately in a trunk of a vehicle or any other places in the home, office, or for the purpose of portability. The foot rests 202 are incorporated with a rotating mechanism that adjusts to the patient's ankle in the X-axis or Y-axis to prevent excess force to the body part, assuming a patient has a contracture in the foot area.

The standing chair 100 is incorporated with a mechanism that manually adjusts the foot rest 202 in the Z-axis according to the length of a patient's shin. Further, the automatic knee adjustment supporting assembly can be positioned to provide the best fit for the patient. In addition, the automatic knee adjustment supporting assembly is automatically adjusted for fixing the distance between the knee and the ankle of the user or patient. Thus, preventing any excess lateral force to the knee during the standing process.

According to the present invention, the angle between the lower leg or shin and the upper leg or thigh can be 90 degree or less than 90 degree when a patient is sitting and is up to 180 degree when the patient is standing. The standing chair 100 is incorporated with a mechanism, which automatically synchronizes the backrest or upper trunk support section 18 and the seat or buttock support section 6 with respect to patient's body to prevent the extreme force from occurring on the patient's back during the act of sitting and standing. Further, the standing chair 100 according to the present invention, is incorporated with fine adjusting mechanism, which enhances synchronization of the backrest or upper trunk support 18 and the seat or buttock support 6 with respect to patient's body.

The present invention is incorporated with a mechanism, which automatically tightens the hip supporting belt when a patient is raised to the standing position and automatically loosens it when returning to the sitting position in accordance with initial settings. The standing chair 100 according to the present invention, comprises a fine adjusting mechanism for use on individual cases. For the purpose of enhancing the flexibility in the hip area comprises a mechanism that produces an angle between the backrest or upper trunk support section 18 and the seat or buttock support section 6 that can be less than 90 degree when a patient is sitting. The armrests 174 are ergonomically be adjusted according to the height and width of a patient. The armrests 174 are foldable for the purpose of reducing the volume of the backrest or upper trunk support section 18 for proper storage and in less space.

The standing chair 100 is incorporated with driving force when it is used for a patient having good upper body strength with no spasms in the lower limbs. In one version, the standing chair 100 may not have its own driving force and incorporated with a gas cylinder to operate manually with the help of a caregiver when it is used for any patients with various severity. In another version, the standing chair 100 may not have a driving force of its own, but instead uses the external lift 301.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions.

Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

The invention claimed is:

1. A standing chair, comprising:
   a main frame support assembly includes a right frame support and a left frame support, wherein the right frame support and left frame support are parallelly connected and securely locked via a connecting means;
   at least two collapsible support arms having a first end and a second end, wherein the first end of the two collapsible support arms are movably affixed to a respective right frame support or left frame support, and the second end of the two collapsible support arms are pivotally connected to a backrest support via one or more fasteners, wherein the two collapsible support arms are configured to be automatically collapsible and retractable in accordance with a sitting mode or standing mode of the standing chair;
   at least one backrest removably positioned on both backrest supports of the right frame support and left frame support and securely locked via one or more fasteners wherein the backrest comprises a backrest frame;
   at least one seat securely and removably assembled to the two collapsible support arms, wherein the seat is configured to move in accordance with the two collapsible support arms;
   one drive member positioned between the right frame support and at least one collapsible support arm on the right side of the standing chair, and another drive member positioned between the left frame support and at least one collapsible support arm on the left side of the standing chair, thereby automatically and comfortably raising the at least one collapsible support arm on the right side and left side of the standing chair, and tilting the seat in accordance with the sitting mode or standing mode of the standing chair using the drive members;
   an automatic backrest adjustment assembly, configured to automatically adjust the backrest while in the sitting mode of the standing chair, and
   a foot rest assembly includes a pair of leg support bars carrying a foot rest, pivotally and adjustably affixed to both the right frame support and left frame support using one or more fasteners.

2. The standing chair of claim 1, further comprises a hip strap assembly including a hip strap fastener, wherein the hip strap assembly is configured to automatically tighten and loosen the hip strap fastener in accordance with the sitting mode or standing mode of the standing chair.

3. The standing chair of claim 1, wherein the at least two collapsible support arms include a first arm and a second arm, wherein the second arm is configured to slidably position into the first arm.

4. The standing chair of claim 1, wherein the connecting means is configured to provide support for the right frame support and left frame support and securely lock within apertures of the right frame support and left frame support via a coupling means.

5. The standing chair of claim 1, wherein the foot rests on both right frame support and left frame support are configured to automatically adjust and rotate in a direction according to a user's feet in accordance with the sitting mode or standing mode of the standing chair.

6. The standing chair of claim 1, further comprises a seat angle adjusting assembly, includes a shaft provided with one or more openings and a stopping plate, wherein the seat angle adjusting assembly is configured to enable a user to adjust the seat angle of the standing chair.

7. A standing chair, comprising:
 a main frame support assembly includes a right frame support and a left frame support, wherein the right frame support and left frame support are parallelly and reversibly connected and securely locked via a connecting means;
 at least two collapsible support arms having a first end and a second end, wherein the two collapsible support arms are telescopic support arms, wherein the first end of the two collapsible support arms are movably affixed to a respective right frame support or left frame support, and the second end of the two collapsible support arms are pivotally connected to a backrest support via one or more fasteners, wherein the two collapsible support arms are configured to automatically collapse and retract in accordance with a sitting mode or standing mode of the standing chair;
 at least one backrest removably positioned on both backrest supports of the right frame support and left frame support and securely locked or unlocked via one or more easily detachable fasteners;
 at least one seat securely and removably assembled to the two collapsible support arms, wherein the seat is configured to move in accordance with the two collapsible support arms;
 an automatic backrest adjustment assembly, configured to automatically adjust the backrest while in the sitting mode of the standing chair;
 an external lift detachably assembled to a driving base on a rear portion of the standing chair, thereby automatically and comfortably raising and tilting the seat in accordance with the sitting mode or standing mode of the standing chair using drive members, and
 a foot rest assembly includes a pair of leg support bars carrying a foot rest, pivotally and adjustably affixed to both the right frame support and left frame support using one or more fasteners.

8. The standing chair of claim 7, further comprises a pair of armrests ergonomically and movably affixed to the backrest, configured to adjust in height and width based on a requirement of the user.

9. The standing chair of claim 7, further comprises a hip strap assembly including a hip strap fastened to the backrest supports of the standing chair, wherein the hip strap assembly is configured to automatically tighten and loosen the hip strap in accordance with the sitting mode or standing mode of the standing chair.

10. The standing chair of claim 7, wherein the at least two collapsible support arms include a first arm and a second arm, wherein the second arm is configured to slidably position into the first arm.

11. The standing chair of claim 7, wherein the connecting means is configured to provide support for the right frame support and left frame support and securely lock within apertures of the right frame support and left frame support via a coupling means.

12. The standing chair of claim 7, wherein the foot rests on both the right frame support and the left frame support are configured to automatically adjust and rotate in a direction according to a user's feet in accordance with the sitting mode or standing mode of the standing chair.

13. The standing chair of claim 7, further comprises a seat height adjusting assembly, includes a shaft provided with one or more openings and a stopping plate, wherein the seat angle adjusting assembly configured to enable a user to adjust the seat angle of the standing chair.

* * * * *